(12) United States Patent
Inagaki et al.

(10) Patent No.: US 7,488,559 B2
(45) Date of Patent: Feb. 10, 2009

(54) SOLID ELECTROLYTE

(75) Inventors: Shinji Inagaki, Nagoya (JP); Shiyou Guan, Kyoto (JP); Yoshiaki Fukushima, Aichi-gun (JP)

(73) Assignee: Kabushiki Kaisha Toyota Chuo Kenkyusho, Aichi-gun (JP)

( * ) Notice: Subject to any disclaimer, the term of this patent is extended or adjusted under 35 U.S.C. 154(b) by 87 days.

(21) Appl. No.: 10/415,353

(22) PCT Filed: Oct. 31, 2001

(86) PCT No.: PCT/JP01/09570

§ 371 (c)(1),
(2), (4) Date: May 6, 2003

(87) PCT Pub. No.: WO02/37506

PCT Pub. Date: May 10, 2002

(65) Prior Publication Data
US 2004/0029015 A1  Feb. 12, 2004

(30) Foreign Application Priority Data
Nov. 6, 2000 (JP) ............................. 2000-337694

(51) Int. Cl.
  H01M 10/40 (2006.01)
  H01M 6/18 (2006.01)
  H01M 8/10 (2006.01)
(52) U.S. Cl. .................. 429/317; 429/314; 429/304; 429/30
(58) Field of Classification Search ............. 429/317, 429/314, 304, 30
See application file for complete search history.

(56) References Cited

U.S. PATENT DOCUMENTS

| | | | | | |
|---|---|---|---|---|---|
| 4,849,311 | A | * | 7/1989 | Itoh et al. | 429/317 |
| 5,283,310 | A | * | 2/1994 | Armand et al. | 528/30 |
| 5,371,154 | A | | 12/1994 | Brandvold et al. | |
| 5,475,162 | A | | 12/1995 | Brandvold et al. | |
| 6,248,686 | B1 | * | 6/2001 | Inagaki et al. | 502/158 |
| 6,447,943 | B1 | * | 9/2002 | Peled et al. | 429/33 |
| 2002/0160268 | A1 | * | 10/2002 | Yamaguchi et al. | 429/254 |

FOREIGN PATENT DOCUMENTS

| | | |
|---|---|---|
| EP | 309259 | 3/1989 |
| EP | 0309259 A2 * | 3/1989 |
| JP | 2001-35509 | 2/2001 |
| JP | 2001-035509 * | 2/2001 |
| JP | 2001-155744 * | 6/2001 |

* cited by examiner

*Primary Examiner*—Patrick Ryan
*Assistant Examiner*—Angela Martin
(74) *Attorney, Agent, or Firm*—Oblon, Spivak, McClelland, Maier & Neustadt, P.C.

(57) ABSTRACT

The solid electrolyte of the present invention is composed of an organic/inorganic composite material having pores with a mean pore diameter of 1 to 30 nm and having a skeleton comprising a metal atom, an oxygen atom bonded to the metal atom, and an organic group having at least one carbon atom bonded to the metal atom or the oxygen atom, and a functional group having an ion exchange function and bonded to the organic group inside the pores. As a result, even if the relative pressure of the water vapor in the atmosphere is less than 1.0, it is still possible to achieve a solid electrolyte with a sufficiently high ion conductivity at a lower temperature than with a conventional solid electrolyte such as stabilized zirconia.

14 Claims, 4 Drawing Sheets

SOLID ELECTROLYTE

TECHNICAL FIELD

This invention relates to a solid electrolyte, and more particularly relates to a solid electrolyte with a porous structure.

BACKGROUND ART

Studies have been conducted in the past into the application of a solid electrolyte having ion conductivity, such as stabilized zirconia, lithium nitride, or β-alumina, to the electrolytic membranes of fuel cells, the electrolyte used in completely solid cells, sensors, and so forth. The ion conductivity of these solid electrolytes is believed to be the result of the movement of ions through the lattice or defects of a solid.

Also, there are polymer electrolytes such as perfluorosulfonic acid or hydrocarbon-based polymers, which have been studied as electrolytic membranes for solid polymer type fuel cells, and it is known that when these are wetted with an electrolytic solution such as water, ions move through the electrolytic solution present in the voids of the polymer chain, resulting in ion conductivity. These are called quasi-solid electrolytes. Among the advantages to these polymer electrolytes are that they exhibit ion conductivity at a relatively low temperature, they are easy to mold into thin films and so forth, and they provide good contact with electrodes, and for these reasons they are very promising as electrolytic membranes for fuel cells.

DISCLOSURE OF THE INVENTION

However, with conventional solid electrolytes, a large amount of activation energy is usually needed for moving the ions through the lattice or defects, so these solid electrolytes do not necessarily exhibit sufficient ion conductivity under low-temperature conditions. Consequently, a problem is that they have to be kept at a high temperature (at least 700° C. in the case of stabilized zirconia, for example) with a heating apparatus or the like in order for sufficiently high ion conductivity to be obtained.

Meanwhile, conventional polymer electrolytes usually exhibit ion conductivity at a lower temperature than the other conventional solid electrolytes discussed above, but adequate ion conductivity is not always exhibited in a state in which the electrolytic solution does not fully fill the voids in the polymer chain. Accordingly, when a polymer electrolyte is used, the vapor pressure of the electrolytic solution has to be kept at the saturated vapor pressure. For example, when water is used for the electrolytic solution, a humidifier or the like has to be used to keep the relative pressure of the water vapor in the atmosphere at 1.0 (that is, a relative humidity of 100%).

The present invention was conceived in light of the above problems encountered with related art, and it is an object thereof to provide a solid electrolyte that exhibits sufficiently high ion conductivity at a lower temperature than with a conventional solid electrolyte such as stabilized zirconia, even if the relative pressure of the water vapor in the atmosphere is less than 1.0.

As a result of diligent research aimed at achieving the stated object, the inventors perfected the present invention upon discovering that the above problems can be solved if an organic/inorganic composite material having pores whose mean pore diameter is within a specific range is used for the material of the electrolytic solution, and functional groups having an ion exchange function are bonded to the organic groups that make up the skeleton of this organic/inorganic composite material.

Specifically, the solid electrolyte of the present invention has pores with a mean pore diameter of 1 to 30 nm, comprising:

an organic/inorganic composite material having:

a skeleton comprising a metal atom, an oxygen atom bonded to the metal atom, and an organic group having at least one carbon atom bonded to the metal atom or the oxygen atom; and a functional group having an ion exchange function and bonded to the organic group inside the pores.

With the present invention, an organic/inorganic composite material having a skeleton with the above-mentioned characteristics and having pores whose mean pore diameter is within the above-mentioned specified range is used as the material for the solid electrolyte, and functional groups having an ion exchange function are bonded to organic groups inside the pores of this organic/inorganic composite material, the result being that even if the relative pressure of the water vapor in the atmosphere is less than 1.0, the pores will still be fully filled with water through capillary action. Within the pores thus fully filled with water, the functional groups having an ion exchange function make it possible for the ions in the water to be sufficiently conducted through the same ion conduction mechanism as with a polymer electrolyte. Therefore, even if the relative pressure of the water vapor in the atmosphere is less than 1.0, it is still possible to obtain sufficiently high ion conductivity at a lower temperature than with a conventional solid electrolyte such as stabilized zirconia.

The term "relative pressure" as used in the present invention refers to the ratio $p/p_0$ between the vapor pressure p of the solvent at a specific temperature and the saturated vapor pressure $p_0$. For instance, in the case of water vapor, a relative pressure of 1.0 is defined to be the same as a relative humidity of 100%.

BEST MODES FOR CARRYING OUT THE INVENTION

Figure 1:
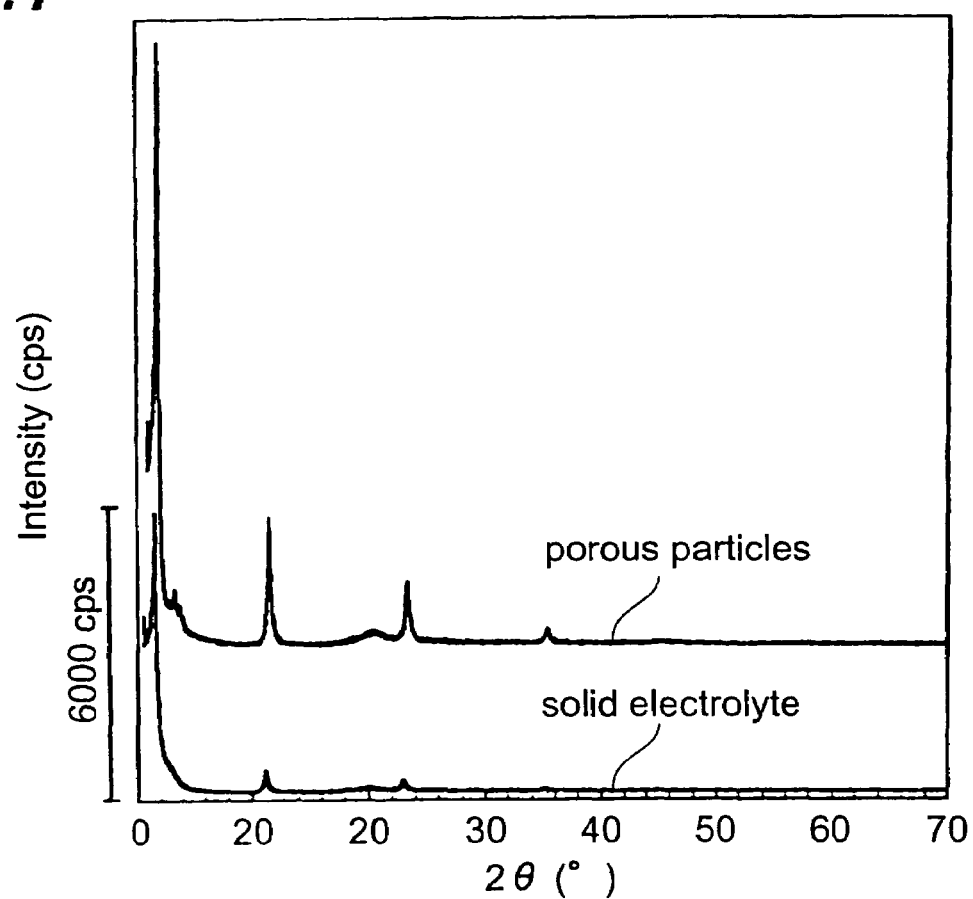
FIG. 1 is a graph of the X-ray diffraction patterns obtained for the solid electrolyte and porous particles in Example 1.

Preferred embodiments of the present invention will now be described in detail.

The organic/inorganic composite material used in the present invention has pores with a mean pore diameter of 1 to 30 nm, and has a skeleton comprising a metal atom, an oxygen atom bonded to the metal atom, and an organic group having at least one carbon atom bonded to the metal atom or the oxygen atom, and a functional group having an ion exchange function and bonded to the organic group inside the pores.

In the organic/inorganic composite material pertaining to the present invention, the mean pore diameter is 1 to 30 nm, as mentioned above, and is preferably 1 to 10 nm. A mean pore diameter of over 30 nm will hinder capillary action, and the pores cannot be fully filled with electrolytic solution even if the relative pressure of the electrolytic solution in the atmosphere is less than 1.0. Also, capillary action generally occurs more readily as the median diameter of the pores is reduced, but if the mean pore diameter is less than 1 nm, the electrolytic solution will be in a form closer to a solid than a liquid, and the ion conductivity will tend to be inadequate. The relation between the relative pressure ($p/p_0$) and the pore diameter (D) at which capillary action occurs is expressed by the following equation (Kelvin's equation).

$$ln(p/p_0) = -(2\gamma V_L \cos\theta)/\{(D/2)RT\}$$

where $\gamma$ is the surface tension of the condensed liquid, $V_L$ is the molar molecular volume of the condensed liquid, $\theta$ is the contact angle between the pore walls and the condensed liquid, R is a gas constant, and T is the absolute temperature.

It can be seen from the above equation that the smaller is the pore diameter, the lower is the relative pressure at which capillary action will occur.

The "mean pore diameter" referred to here is the pore diameter at the maximum peak of the curve (pore diameter distribution curve) obtained by plotting the value (dV/dD) obtained by differentiating the pore volume (V) with the pore diameter (D) against the pore diameter (D). A pore diameter distribution curve can be produced by the following method. The organic/inorganic composite material is cooled to the temperature of liquid nitrogen (−196° C.), nitrogen gas is introduced, the amount of adsorption thereof is found by a constant volume or weight method, then the pressure of the introduced nitrogen gas is slowly increased, the amount of nitrogen gas adsorption is plotted against the various equilibrium pressures, and an adsorption isotherm is obtained. This adsorption isotherm can be used to find the pore diameter distribution curve by the Cranston-Inklay method, the Pollimore-Heal method, the BJH method, or another such calculation method.

The organic/inorganic composite material pertaining to the present invention is preferably such that at least 60% of the total pore volume is included in the range of ±40% of the mean pore diameter on the pore diameter distribution curve. The phrase "at least 60% of the total pore volume is included in the range of ±40% of the mean pore diameter on the pore diameter distribution curve" as used here means that if the mean pore diameter is 3.00 nm, for example, the combined volume of pores within ±40% of this 3.00 nm, that is, within a range of 1.80 to 4.20 nm, accounts for at least 60% of the total pore volume. What this means is that an organic/inorganic composite material that satisfies this requirement has an extremely uniform pore diameter.

There are no particular restrictions on the specific surface area of the organic/inorganic composite material pertaining to the present invention, but at least 700 m²/g is preferable. The specific surface area can be calculated as the BET specific surface area from the adsorption isotherm using a BET isotherm adsorption formula.

It is also preferable for the organic/inorganic composite material pertaining to the present invention to have at least one peak for diffraction angle corresponding to a d value of at least 1 nm in the X-ray diffraction of this material. An X-ray diffraction peak means that there is a periodic structure of the d value corresponding to the peak angle thereof in the sample. Therefore, one or more peaks in the diffraction angle corresponding to a d value of 1 nm or more means that the pores are regularly arranged at a spacing of at least 1 nm.

The pores of the organic/inorganic composite material pertaining to the present invention are formed not only on the surface of the particles, but also in the interior. There are no particular restrictions on the shape of these pores, but they may, for example, go through the material in the form of tunnels, or they may consist of spherical or polyhedral cavities linked together.

As discussed above, the organic/inorganic composite material pertaining to the present invention has a skeleton comprising a metal atom, an oxygen atom bonded to the metal atom, and an organic group having at least one carbon atom bonded to the metal atom or the oxygen atom. Examples of this skeleton include the following (a) and (b).

(a) A skeleton composed of an organic group having one or more carbon atoms, two or more metal atoms bonded to the same or different carbon atoms in the organic group, and one or more oxygen atoms bonded to the metal atoms (hereinafter referred to as "organic/inorganic hybrid skeleton").

(b) An inorganic skeleton composed of a metal atom and an oxygen atom bonded to this metal atom, in which an organic group having one or more carbon atoms is bonded to the metal atom or the oxygen atom (hereinafter referred to as "surface modified organic/inorganic composite skeleton").

The organic group in the organic/inorganic hybrid skeleton must have a valence of at least 2 in order to bond with the two or more metal atoms. Examples of such organic groups include divalent or higher organic groups produced when two or more hydrogen atoms are removed from an alkane, alkene, alkyne, benzene, cycloalkane, or other such hydrocarbon. The organic/inorganic hybrid skeleton pertaining to the present invention may include just one type of the above-mentioned organic group, or may contain two or more types.

In the present invention, it is preferable for the valence of the organic group to be 2 because this will give an organic/inorganic composite material with the proper degree of crosslinking. Examples of divalent organic groups include a methylene group ($-CH_2-$), ethylene group ($-CH_2CH_2-$), trimethylene group ($-CH_2CH_2CH_2-$), tetramethylene group ($-CH_2CH_2CH_2CH_2-$), 1,2-butylene group ($-CH(C_2H_5)CH-$), 1,3-butylene group ($-CH(CH_3)CH_2CH_2-$), phenylene group ($-C_6H_4-$), diethylphenylene group ($-C_2H_4-C_6H_4-C_2H_4-$), vinylene group ($-CH=CH-$), propenylene group ($-CH_2-CH=CH_2-$), butenylene group ($-CH_2-CH=CH-CH_2-$), amide group ($-CO-NH-$), dimethylamino group ($-CH_2-NH-CH_2-$), and trimethylamine group ($-CH_2-N(CH_3)-CH_2-$). Of these, a methylene group, ethylene group, or phenylene group is preferred because they allow porous particles with a high crystallinity to be obtained.

Two more metal atoms are bonded to the same or different carbon atoms in the above-mentioned organic group, and while there are no particular restrictions on the type of these metal atoms, examples include silicon, aluminum, titanium, magnesium, zirconium, tantalum, niobium, molybdenum, cobalt, nickel, gallium, beryllium, yttrium, lanthanum, hafnium, tin, lead, vanadium, and boron. Of these, silicon, aluminum, and titanium are preferred because bonding will be better with the organic group and the oxygen. The above-mentioned metal atoms form an oxide by bonding with the organic group and bonding with an oxygen atom, and this oxide maybe a compound oxide consisting of two or more types of metal atom.

The organic/inorganic hybrid skeleton is formed by the bonding of the above-mentioned organic group, metal atoms, and oxygen atom, but the type of these bonds is not limited, and examples include covalent bonds and ion bonds. Organic/inorganic composite materials with different skeletons (linear, ladder-shaped, reticulated, branched, etc.) will be produced depending on the number of metal atoms bonded to the organic group, and the oxygen atoms bonded to the metal atoms.

In the organic/inorganic hybrid skeleton, since the organic group is bonded to two or more metal atoms, and these metal atoms are bonded to one or more oxygen atoms, the organic group is incorporated into the skeleton of a metal oxide. As a result, the organic/inorganic composite material pertaining to the present invention exhibits the surface characteristics of both an organic and an inorganic material.

Of these organic/inorganic hybrid skeletons, one composed of at least one type of structural unit expressed by the following General Formula (1) is preferable.

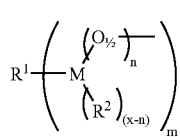
(1)

In Formula (1) above, $R^1$ is an organic group with at least one carbon atom, and M is a metal atom. Specific examples of $R^1$ and M are the groups or atoms listed above in the description of the organic group and metal atom.

In Formula (1) above, $R^2$ is a hydrogen atom, a hydroxyl group, or a hydrocarbon group. If $R^2$ is a hydrocarbon group, there are no restrictions on the type thereof, but examples of $R^2$ include $C_1$ to $C_{10}$ alkyl groups, $C_1$ to $C_{10}$ alkenyl groups, a phenyl group, and substituted phenyl groups.

x in the above General Formula (1) is an integer obtained by subtracting 1 from the valence of the metal M, n is an integer greater than or equal to 1 and less than or equal to x, and m is an integer greater than or equal to 1. The carbons of $R^1$ to which M is bonded may be the same or different. —$O_{1/2}$— here indicates a group that becomes —O— when two of these groups are bonded.

When $R^1$, M, $R^2$, n, and m in General Formula (1) above are an ethylene group, silicon atom, methyl group, 1, and 2, respectively, General Formula (1) is expressed by the following Chemical Formula (2).

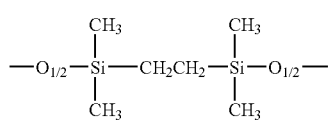
(2)

A skeleton in which two of the structural units of the above Chemical Formula (2) are linked is expressed by the following Chemical Formula (3).

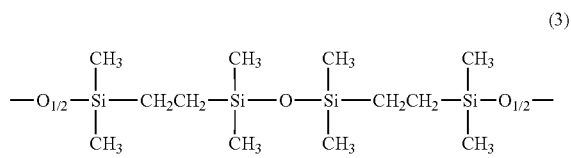
(3)

When $R^1$, M, n, and m in General Formula (1) above are an ethylene group, silicon atom, 3, and 2, respectively, General Formula (1) is expressed by the following Chemical Formula (4).

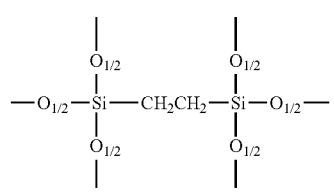
(4)

When a plurality of the structural units of the above Chemical Formula (4) are linked, a reticulated structure is formed. The following Chemical Formula (5) expresses a case in which four of the structural units of the above Chemical Formula (4) are linked, as an example of this reticulated structure.

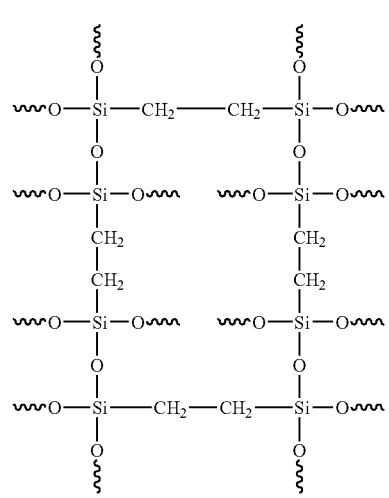
(5)

The organic/inorganic hybrid skeleton pertaining to the present invention may be composed of a plurality of structural units in which $R^1$, M, $R^2$, n, and m in General Formula (1) above are different. For example, this skeleton may be composed of structural units expressed by the above Chemical Formula (2) and structural units expressed by the above Chemical Formula (4). When the organic/inorganic composite material pertaining to the present invention has structural units expressed by the above General Formula (1) as an organic/inorganic hybrid skeleton, in addition to these structural units, the material may also have structural units such as Si—$(O_{1/2})_4$— or Ti—$(O_{1/2})_4$—.

An organic/inorganic composite material having an organic/inorganic hybrid skeleton can be obtained, for example, by the polycondensation of at least one type of compound expressed by the following general formula.

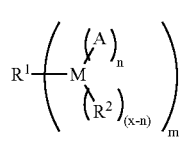
(6)

$R^1$, M, and $R^2$ here are the same as $R^1$, M, and $R^2$ in the above General Formula (1), respectively. A is an alkoxy group or a halogen atom, x is an integer obtained by subtracting 1 from the valence of the metal M, n is an integer greater than or equal to 1 and less than or equal to x, and m is an integer greater than or equal to 1. The carbons of $R^1$ to which M is bonded may be the same or different.

When A in the above General Formula (6) is an alkoxy group, there are no restrictions on the type of hydrocarbon group bonded to the oxygen in that alkoxy group, but examples include linear, cyclic, and alicyclic hydrocarbons. This hydrocarbon group is preferably a $C_1$ to $C_5$ linear alkyl group, with a methyl group or ethyl group being particularly favorable.

When A in the above General Formula (6) is a halogen atom, there are no restrictions on the type thereof, but examples include a chlorine atom, bromine atom, fluorine atom, and iodine atom. Of these, chlorine and bromine are preferred.

When $R^1$, M, A, n, and m in General Formula (6) above are an ethylene group, silicon atom, methoxy group, 3, and 2, respectively, the compound expressed by General Formula (6) is 1,2-bis(trimethoxysilyl)ethane, which is expressed by $(CH_3O)_3Si$—$CH_2$—$CH_2$—$Si(OCH_3)_3$.

When $R^1$, M, A, n, and m in General Formula (6) above are an ethylene group, silicon atom, chlorine, 3, and 2, respectively, the compound expressed by General Formula (6) is 1,2-bis(trichlorosilyl)ethane, which is expressed by $Cl_3Si$—$CH_2$—$CH_2$—$SiCl_3$.

In the present invention, an alkoxysilane, titanium alkoxide, aluminum alkoxide, or the like may be added by polycondensation to the compound expressed by General Formula (6).

This alkoxysilane can be tetramethoxysilane, tetraethoxysilane, tetrapropoxysilane, or the like. An alkoxysilane having a functional group such as an amino group, carboxyl group, mercapto group, or epoxy group can also be used.

The titanium alkoxide can be titanium butoxide, titanium isopropoxide, or titanium ethoxide, for example, and the aluminum alkoxide can be aluminum isopropoxide, for example. Various kinds of metal halide such as silicon chloride ($SiCl_4$) can also be used.

An $SiO_2$—$Al_2Al_2O_3$ skeleton can be introduced into the alkoxysilane or compound expressed by the above General Formula (6) by adding and reacting pseudo-boehmite, sodium alumate, aluminumsulfate, dialkoxyaluminotrialkoxysilane, or the like. A skeleton of vanadium, boron, or manganese can be introduced by adding and reacting vanadyl sulfate ($VOSO_4$), boric acid ($H_3BO_3$), manganese chloride ($MnCl_2$), or the like.

In the manufacture of an organic/inorganic composite material having an organic/inorganic hybrid skeleton, it is preferable to add a compound expressed by the above General Formula (6) to an aqueous solution containing a surfactant, and perform polycondensation under acidic or alkaline conditions.

This surfactant can be an anionic, cationic, or nonionic surfactant. Examples of this surfactant include a chloride, bromide, iodide, hydroxide, or the like of an alkyltrimethylammonium $[C_nH_{2n+1}N(CH_3)_3]$, alkylammonium, dialkyldimethylammonium, or benzylammonium, as well as fatty acid salts, alkylsulfonates, alkylphosphates, polyethylene oxide-based nonionic surfactants, and primary alkylamines.

It is preferable for the alkyltrimethylammonium $[C_nH_{2n+1}N(CH_3)_3]$ to be one in which the carbon number of the alkyl group is from 8 to 18.

Examples of nonionic surfactants include polyoxyethylene oxide-based nonionic surfactants having a hydrocarbon group as its hydrophobic component and having polyethylene oxide chain as its hydrophilic component. Examples of such surfactants include $C_{16}H_{33}(OCH_2CH_2)_2OH$, $C_{12}H_{25}(OCH_2CH_2)_4OH$, $C_{16}H_{33}(OCH_2CH_2)_{10}OH$, $C_{16}H_{33}(OCH_2CH_2)_{20}OH$, $C_{18}H_{37}(OCH_2CH)_{10}OH$, $C_{18}H_{35}(OCH_2CH_2)_{10}OH$, and $C_{12}H_{25}(OCH_2CH_2)_{23}OH$.

A surfactant having a sorbitan fatty acid ester component and a polyethylene oxide component can also be used. Examples of such surfactants include Triton X-100 (Aldrich), polyethylene oxide (20) sorbitan monolaurate (Tween 20, Aldrich), polyethylene oxide (20) sorbitan monopalmitate (Tween 40), polyethylene oxide (20) sorbitan monooleate (Tween60), and sorbitan monopalmitate (Span 40).

A tri-block copolymer composed of three polyalkylene oxide chains can also be used as a surfactant. Of these, a tri-block copolymer composed of a polyethylene oxide (EO) chain, a polypropylene oxide (PO) chain, and a polyethylene oxide (EO) chain is preferred. If we let x be the number of EO chain repeating units and y be the number of PO chain repeating units, this tri-block copolymer can be expressed by $(EO)_x(PO)_y(EO)_x$. There are no particular restrictions on x and y in the tri-block copolymer used in the present invention, but it is preferable for x to be 5 to 110 and y to be 15 to 70. It is particularly preferable for x to be 15 to 20 and y to be 50 to 60.

A tri-block copolymer composed of a polypropylene oxide (PO) chain, a polyethylene oxide (EO) chain, and a polypropylene oxide (PO) chain $((PO)_x(EO)_y(PO)_x)$ can also be used favorably. There are no particular restrictions on x and y here, but it is preferable for x to be 5 to 110 and y to be 15 to 70, and even more preferable for x to be 15 to 20 and y to be 50 to 60.

Examples of the above-mentioned tri-block copolymer include $(EO)_5(PO)_{70}(EO)_5$, $(EO)_{13}(PO)_{30}(EO)_{13}$, $(EO)_{20}(PO)_{30}(EO)_{20}$, $(EO)_{26}(PO)_{39}(EO)_{26}$, $(EO)_{17}(PO)_{56}(EO)_{17}$, $(EO)_{17}(PO)_{58}(EO)_{17}$, $(EO)_{20}(PO)_{70}(EO)_{20}$, $(EO)_{80}(PO)_{30}(EO)_{80}$, $(EO)_{106}(PO)_{70}(EO)_{106}$, $(EO)_{100}(PO)_{39}(EO)_{100}$, $(EO)_{19}(PO)_{33}(EO)_{19}$, and $(EO)_{26}(PO)_{36}(EO)_{26}$. Of these, it is preferable to use $(EO)_{17}(PO)_{56}(EO)_{17}$ and $(EO)_{17}(PO)_{58}(EO)_{17}$. These tri-block copolymers are available from BASF and elsewhere, and a tri-block copolymer having the desired x and y values can be obtained on a small-scale manufacturing level. The above-mentioned tri-block copolymers can be used singly or in combinations or two or more types.

A star-type block copolymer in which two polyethylene oxide (EO) chain/polypropylene oxide (PO) chain units are bonded to two nitrogen atoms in ethylenediamine, respectively, can also be used. Examples of this star-type block copolymer include $((EO)_{113}(PO)_{22})_2NCH_2CH_2N((PO)_{22}(EO)_{113})_2$, $((EO)_3(PO)_{18})_2NCH_2CH_2N((PO)_{18}(EO)_3)_2$, and $((PO)_{19}(EO)_{16})_2NCH_2CH_2N((EO)_{16}(PO)_{19})_2$. The above-mentioned star-type block copolymers can be used singly or in combinations or two or more types.

An organic/inorganic composite material having an organic/inorganic hybrid skeleton can be obtained by adding a compound expressed by the above General Formula (6) (and, if necessary, an inorganic compound such as an alkoxysilane) to an aqueous solution containing a surfactant, and performing polycondensation under acidic or alkaline conditions, but it is preferable for the pH of the aqueous solution to be 7 or higher.

Also, an organometal compound (and an inorganic compound if needed) can be subjected to polycondensation in the absence of a surfactant and under acidic or alkaline conditions to form an oligomer, and a surfactant can be added to an aqueous solution containing this oligomer, and polycondensation again performed under acidic or alkaline conditions.

In the polycondensation performed in the presence of a surfactant, it is also possible for polycondensation under alkaline conditions and polycondensation under acidic conditions to be performed alternately. There are no particular restrictions on the order of the alkaline and acidic conditions here, but the degree of polymerization will tend to be higher if polycondensation is first performed under acidic conditions and then under alkaline conditions. Also, it is preferable for the system to be alternately agitated and allowed to stand during the polycondensation reaction.

The polycondensation reaction temperature is preferably between 0 and 100° C., but the lower the temperature, the more regular the structure of the product will tend to be. The best reaction temperature for increasing the regularity of the structure is 20 to 40° C. On the other hand, the higher the reaction temperature, the more stable the structure will tend to be. The best reaction temperature for raising the degree of polymerization is 60 to 80° C.

After the polycondensation reaction, aging is performed, and the precipitate or gel thus produced is filtered and, if needed, washed, and then dried, which gives a porous material precursor in which the pores are still filled with surfactant.

This porous particle precursor can be dispersed in an aqueous solution containing the same surfactant as that used in the polycondensation reaction (typically the surfactant concentration is the same as or lower than that during the polycondensation reaction) or in an electrolytic solution such as water, and the precursor subjected to a wet heat treatment at 50 to 200° C. In this case, the system can be heated with or without the solution used in the polycondensation reaction being diluted. The heating temperature is preferably from 60 to 100° C., with 70 to 80° C. being particularly favorable. The pH here should be weakly alkaline, and is preferably 8 to 8.5, for example. There are no particular restrictions on the duration of the wet heat treatment here, but an hour or longer is preferable, with 3 to 8 hours being particularly good.

After this wet heat treatment, the porous material precursor is filtered and dried to remove any excess treatment liquid. The porous material precursor may be agitated at room temperature for anywhere from a few hours to a few dozen hours prior to being dispersed in the above-mentioned aqueous solution or solvent, having its pH adjusted, and undergoing the wet heat treatment.

The surfactant is then removed from the porous material precursor, and examples of how this can be accomplished include baking, and treating with a solvent such as water or an alcohol.

When baking is employed, the porous particle precursor is heated at 300 to 1000° C., and preferably 400 to 700° C. About 30 minutes is long enough for the heating, but heating for at least an hour is preferable in order to completely remove the surfactant component. This baking can be carried out in the air, but since a large amount of combustion gas is produced, it may also be performed while an inert gas such as nitrogen is introduced.

When a solvent is used to remove the surfactant from the porous particle precursor, for example, the porous material precursor is dispersed in a solvent with good surfactant solubility, and the system is agitated to recover the solids. Water, ethanol, methanol, acetone, or the like can be used as the solvent.

When a cationic surfactant is used, the porous material precursor is dispersed in water or ethanol to which a small amount of hydrochloric acid has been added, and the system is agitated under heating at 50 to 70° C. This results in the cationic surfactant being ion-exchanged and extracted by protons. When an anionic surfactant is used, it can be extracted in a solvent to which an ion shave been added. When a nonionic surfactant is used, it can be extracted with just a solvent. The system is preferably ultrasonically bombarded during this extraction. Also, combining or repeating agitation and standing is preferable.

The shape of the organic/inorganic composite material pertaining to the present invention can be controlled by varying the synthesis conditions. The shape of the organic/inorganic composite material reflects the structure in which the pores of the particles are arranged, and the shape is also determined by the crystal structure. For instance, the crystal structure of spherical particles is three-dimensionally hexagonal, while the crystal structure of particles in the form of hexagonal prisms is two-dimensionally hexagonal. The crystal structure of octadecahedral particles is cubic.

Examples of synthesis conditions that affect the shape (crystal structure) of the organic/inorganic composite material include the reaction temperature and the length (carbon number) of the surfactant. For example, when an alkyltrimethylammonium is used as the surfactant, the carbon number of the alkyl groups thereof and the reaction temperature affect the shape of the organic/inorganic composite material. For instance, when the reaction temperature is 95° C. and the carbon number of the alkyl groups is 18, particles tend to be produced in the form of hexagonal prisms, but when the reaction temperature is 95° C. and the carbon number of the alkyl groups is 16, octadecahedral particles tend to be produced. When the reaction temperature is 25° C., spherical particles tend to be produced whether the carbon number of the alkyl groups is 16 or 18. On the other hand, a laminar structure results when the reaction temperature is 2° C. and the carbon number of the alkyl groups is 18, while spherical particles tend to be produced when the reaction temperature is 2° C. and the carbon number of the alkyl groups is 16.

Meanwhile, the surface modified organic/inorganic composite skeleton (b) has a polymer main chain of an inorganic oxide made up of metal atoms and oxygen atoms. Examples of the metal atoms that make up part of the main chain are the same as the metal atoms listed in the above description of the organic/inorganic hybrid skeleton, and of these, silicon, aluminum, and titanium are preferred because they bond better with organic groups and oxygen. Furthermore, the metal atoms bond with oxygen atoms to form an oxide in an surface modified organic/inorganic composite skeleton, and this oxide may be a compound oxide containing two or more types of metal atom. The main chain of an inorganic skeleton may be linear, branched, ladder-shaped, or reticulated.

Specific examples of the organic groups in the surface modified organic/inorganic composite skeleton include a methyl group, ethyl group, or other such $C_1$ to $C_6$ alkyl group; and a phenyl group or other such $C_6$ to $C_{12}$ aryl group. The bonding position of these organic groups may be either the oxygen atoms or the metal atoms that make up the inorganic skeleton.

There are no particular restrictions on the method for manufacturing an organic/inorganic composite material having a surface modified organic/inorganic composite skeleton, but when a silicate skeleton (—Si—O—) is formed, for example, [this material] can be obtained by subjecting an organosilane expressed by the following Formula (7):

$$R\text{—}Si(OR')_3 \qquad (7)$$

where R is a $C_1$ to $C_6$ alkyl group or a $C_6$ to $C_{12}$ aryl group, and R' is a methyl group or ethyl group, and, if needed, an alkoxysilane such as tetramethoxysilane, tetraethoxysilane, or tetrapropoxysilane to polycondensation using a template surfactant, and then removing the surfactant. Organic groups can also be introduced at the surface of the inorganic skeleton by subjecting the above-mentioned alkoxysilane or an inorganic skeleton component such as sodium silicate or kanemite ($NaHSi_2O_5 \cdot 3H_2O$) to polycondensation using a surfactant, removing the surfactant to obtain an inorganic porous material, and then reacting the silanol groups (Si—OH) present on the surface of the inorganic skeleton with the above-mentioned organosilane or a halogenated organosilane such as trimethoxychlorosilane [Cl—Si—$(OCH_3)_3$].

It is also possible to form an inorganic skeleton containing aluminum by using pseudo-boehmite, sodium alumate, aluminumsulfate, dialkoxyaluminotrialkoxysilane, or the like. A metallosilicate-based skeleton ($SiO_2$-$MO_{n/2}$) in which any of various metals ($M^{n+}$; where M is a metal such as titanium, zirconium, tantalum, niobium, tin, or hafnium) is included in a silicate skeleton can be obtained by using an oxide in which the silicon of the inorganic skeleton component given as an example in the formation of the above-mentioned silicate skeleton is substituted with titanium, zirconium, tantalum, niobium, tin, or hafnium. More specifically, a metallosilicate porous material in which titanium, vanadium, boron, or manganese has been introduced can be obtained by adding Ti $(OC_2H_5)_4$ or another such titanate compound, vanadyl sulfate ($VOSO_4$), boric acid ($H_3BO_3$), or manganese chloride ($MnCl_2$), respectively, to an alkoxysilane and performing a copolymerization reaction.

The same surfactants as those given in the description of the organic/inorganic hybrid skeleton can be used as a template in the formation of the surface modified inorganic/inorganic composite skeleton, and the polycondensation and removal of the surfactant can be accomplished in the same way as in the formation of the organic/inorganic hybrid skeleton.

The solid electrolyte of the present invention has a structure in which functional groups having an ion exchange function are bonded to organic groups inside the pores of the organic/inorganic composite material having the above structure, and exhibits sufficiently high ion conductivity at a lower temperature than with a conventional solid electrolyte such as stabilized zirconia, even if the relative pressure of the water vapor in the atmosphere is less than 1.0.

The functional groups having an ion exchange function here have, in addition to a function of imparting ion conductivity to the solid electrolyte of the present invention, a function of making it easier for the pores to be filled with water or another such electrolytic solution. Specifically, capillary action will occur even if the functional groups having an ion exchange function are not disposed in the pores of the organic/inorganic composite material pertaining to the present invention, but disposing the functional groups having an ion exchange function inside these pores in the solid electrolyte of the present invention allows the pores to be fully filled with electrolytic solution under conditions of lower relative pressure of the electrolytic solution.

Specific examples of functional groups having an ion exchange function include sulfonic acid groups, phosphoric acid groups, carboxylic acid groups, and sulfonimide groups, but it is preferable for this functional group to be at least one selected from the group consisting of sulfonic acid groups (—$SO_3H$), phosphoric acid groups (—$PO_4H_2$ or >$PO_4H$), and carboxylic acid groups (—COOH) because the pores can then be fully filled with electrolytic solution at a lower relative pressure of the electrolytic solution, and higher ion conductivity can be obtained.

There are no particular restrictions on the method for bonding the functional groups having an ion exchange function to the organic groups, but examples include a method in which fuming sulfuric acid, sulfuric anhydride (sulfer trioxide, $SO_3$), chlorosulfonic acid (chlorosulfuric acid, $ClCO_3H$), or another such sulfonic oxidant is used when the functional group having an ion exchange function is a sulfonic acid group; a method in which phosphorus oxychloride or another such phosphorus oxidant is used, or in which chloromethylation is followed by reaction of triethyl phosphite and then hydrolysis, when the functional group having an ion exchange function is a phosphoric acid group; and a method in which a group whose side-chain group or terminal group is a methyl group is introduced as an organic group, and this methyl group is oxidized, when the functional group having an ion exchange function is a carboxylic acid group.

There are no particular restrictions on the form of the solid electrolyte of the present invention obtained as above, but this solid electrolyte can be made into a thin film and used favorably as a solid electrolyte membrane. A solid electrolyte thin film can be favorably obtained in the process of manufacturing the organic/inorganic composite material, for example, by coating a glass substrate or the like with a sol solution containing a porous material precursor, drying and then baking the coating to remove the surfactant and obtain an organic/inorganic composite in the form of a thin film, and then bonding a functional group having an ion exchange function to the organic group by one of the methods given above.

When the solid electrolyte of the present invention is in the form of particles, the solid electrolyte particles of the present invention can also be used as a compound electrolyte dispersed in another electrolyte (hereinafter referred to as a "second electrolyte"). Examples of this second electrolyte include perfluorosulfonic acid, perfluorophosfonic acid, polystyrenesulfonic acid, polyvinylbenzylphosphonic acid, polytrifluorostyrenesulfonic acid, [3] and other such homopolymers and copolymers; graft polymers obtained by graft-polymerizing styrene or trifluorostyrene to a fluororesin such as ethylene-tetrafluoroethylene copolymers, polytetrafluoroethylene, a tetrafluoroethylene-hexafluoropropylene copolymer, polyvinylidene fluoride, ahexafluoropropylene-vinylidene fluoride copolymer, or an ethylene-chlorotrifluoroethylene copolymer, and performing sulfonation or methylphosphonation; and polysulfone sulfonic acid membranes, polyether ether ketone sulfonic acid membranes, polyparaphenylene derivative sulfonic acid membranes, and other such hydrocarbon-based polymers. This second electrolyte can be synthesized by a known method, or a commercially available product may be used. For instance, in the case of perfluorosulfonic acid, tetrafluoroethylene and a perfluoroalkylsulfonic acid vinyl ether may be copolymerized under specific conditions, or a commercially available product such as Aciplex, Nafion, or Flemion may be used.

There are no particular restrictions on the amount in which the solid electrolyte particles of the present invention are contained in the composite electrolyte of the present invention, as long as the excellent ion conductivity thereof is not compromised, but a preferable amount is 40 to 80 wt % of the total amount of the composite electrolyte. If the solid electrolyte of the present invention is contained in the composite electrolyte in an amount below the above range, a sufficiently high ion conductivity will tend not to be obtained if the relative pressure of the electrolytic solution in the atmosphere is less than 1.0, but if the above range is exceeded, the material will tend to be difficult to mold into a film and film strength will tend to be lower.

The solid electrolyte and composite electrolyte of the present invention having the above structure provide sufficiently high ion conductivity at a lower temperature than with a conventional solid electrolyte such as stabilized zirconia, even if the relative pressure of the water vapor in the atmosphere is less than 1.0, and can be used favorably in applications such as the electrolytic membranes solid polymer-type fuel cells or oxide-type fuel cells, the electrolyte used in completely solid cells, sensors, and so forth. There are no particular restrictions on the electrolytic solution used in the present invention, but specific examples include water, alcohol, pyridine, and imidazole, of which the use of water is preferred. Nor are there are any particular restrictions on the usage conditions for the solid electrolyte and composite electrolyte of the present invention, but it is preferable for the relative pressure of the electrolytic solution to be from 0 to 70%, and for the usage temperature to be between 0 and 100° C.

EXAMPLES

The present invention will now be described in more specific terms through on the basis of examples and comparative examples, but the present invention is not limited in any way by the following examples.

Example 1

Production of Porous Particles 16.665 g (47.88 mmol) of octadecyltrimethylammonium chloride ($C_{18}H_{37}N(CH_3)_3Cl$, hereinafter referred to as "$C_{18}TMA$"), 500 g of ion exchange water, and 40 g of a 6N NaOH aqueous solution (NaOH content: 200 mmol) were put into a 1000 mL pear-shaped flask and stirred at 50 to 60° C., which gave a transparent solution. This solution was cooled to room temperature, after which it was briskly stirred while 20 g (49.67 mmol) of 1,4-bis(triethoxysilyl)benzene (hereinafter referred to as "BTEB") was added, then an ultrasonic treatment was performed for 20 minutes while the flask was shaken by hand, which dispersed the BTEB in the solution. The reaction mixture thus obtained was allowed to stand for 20 hours at 95 to 98° C., which produced a white precipitate. The reaction mixture was filtered without being cooled, and the precipitate was recovered, which yielded 8.22 g of porous particle precursor containing a surfactant.

Next, 1 g of the porous particle precursor obtained above was dispersed in 250 mL of a hydrochloric acid-ethanol mixed solution containing 36 wt % hydrochloric acid, and then stirred for 8 hours at 70° C. The precipitate was then recovered by filtration, washed with 250 mL of anhydrous ethanol, dried with forced air, and then vacuum dried at room temperature and $10^{-2}$ to $10^{-3}$ Torr, in that order, which gave the targeted porous particles.

Figure 2:
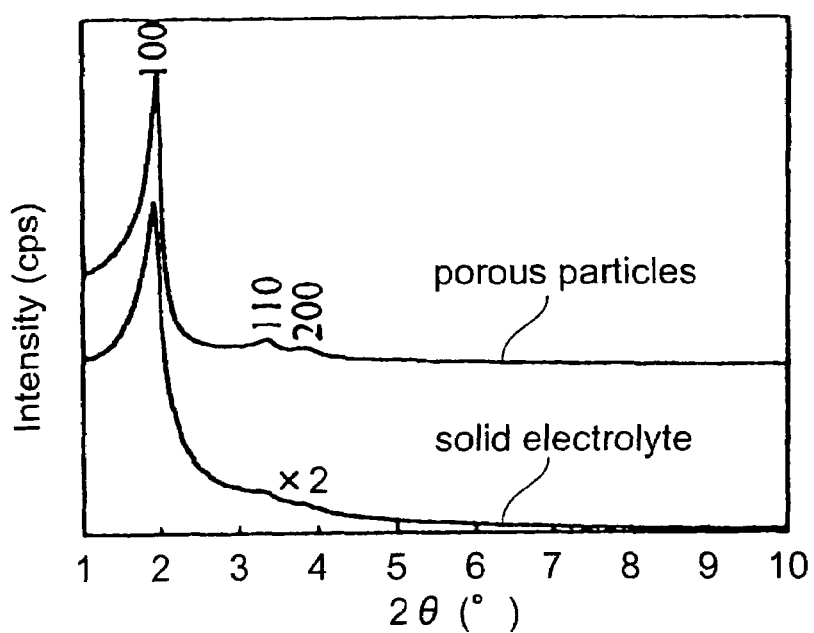
FIG. 2 is a graph of the X-ray diffraction patterns obtained for the solid electrolyte and porous particles in Example 1.
Figure 3:
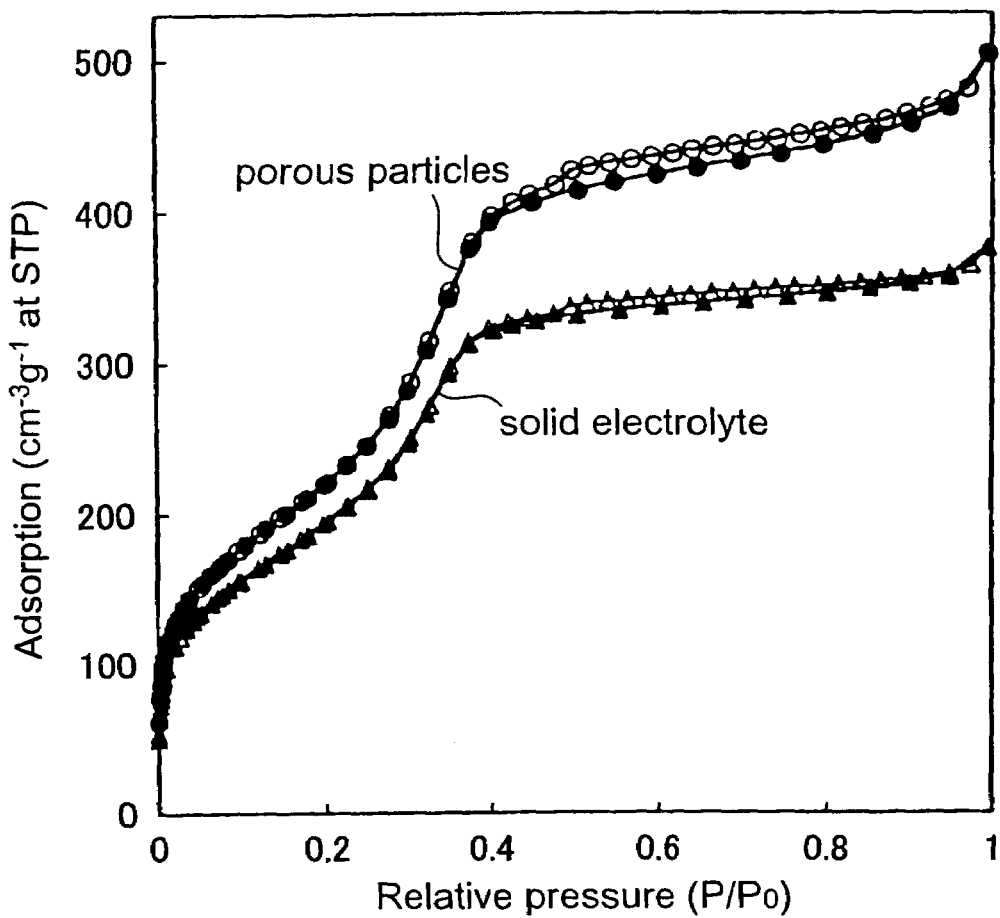
FIG. 3 is a graph of the nitrogen adsorption isotherms obtained for the solid electrolyte and porous particles in Example 1.
Figure 4:
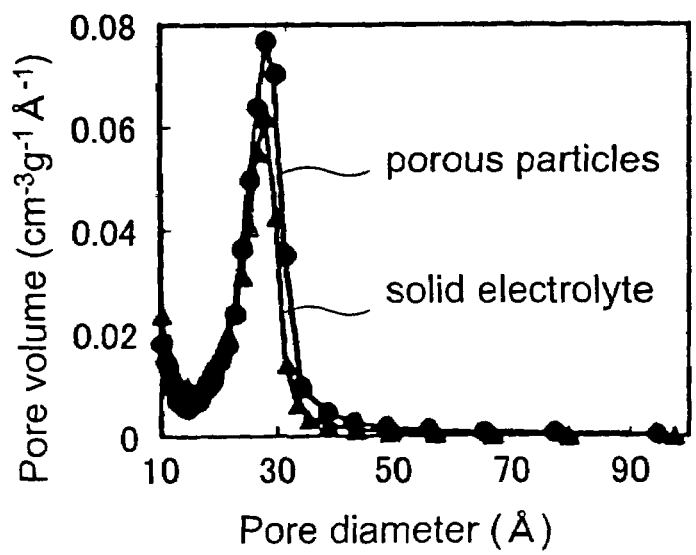
FIG. 4 is a graph of the pore diameter distribution curve obtained for the solid electrolyte and porous particles in Example 1.

The porous particles thus obtained were measured by $^{13}C$—NMR and $^{29}Si$—NMR, subjected to X-ray analysis, measured for nitrogen adsorption isotherm, and observed under an electron microscope. FIGS. 1 and 2 show the X-ray diffraction patterns obtained, FIG. 3 shows the nitrogen adsorption isotherm, and FIG. 4 shows the pore diameter distribution curve. The X-ray diffraction pattern in FIG. 2 is a detail view of the region where the 2θ of the X-ray pattern shown in FIG. 1 is 1 to 10.

The above measurement results confirmed that the obtained porous particles had two-dimensionally hexagonal meso pores, that the skeleton thereof was made up of —$C_6H_4$—$Si_2O_3$—, and that the surfactant had been completely removed. It was also found that the mean pore diameter of the porous particles was 2.8 nm, the BET specific surface area was 850 m²/g, the pore volume was 0.63 cm³, and the thickness of the pore walls was 2.5 nm.

Production of Solid Electrolyte (Sulfonylation)

23 g of 50 mass % fuming sulfuric acid was added to 0.5 g of the above-mentioned porous particles and stirred for 5 hours at 95 to 105° C. The reaction mixture was cooled to room temperature, after which ethanol was added so as to decompose the excess fuming sulfuric acid. The precipitate in the reaction mixture was recovered by filtration and washed with water, after which ion exchange water was added and the system was boiled for 1 hour. The system was then stirred overnight in 6N hydrochloric acid, and the precipitate obtained by filtration was vacuum dried at room temperature and $10^{-2}$ to $10^{-3}$ Torr to obtain the targeted solid electrolyte.

Figure 5:
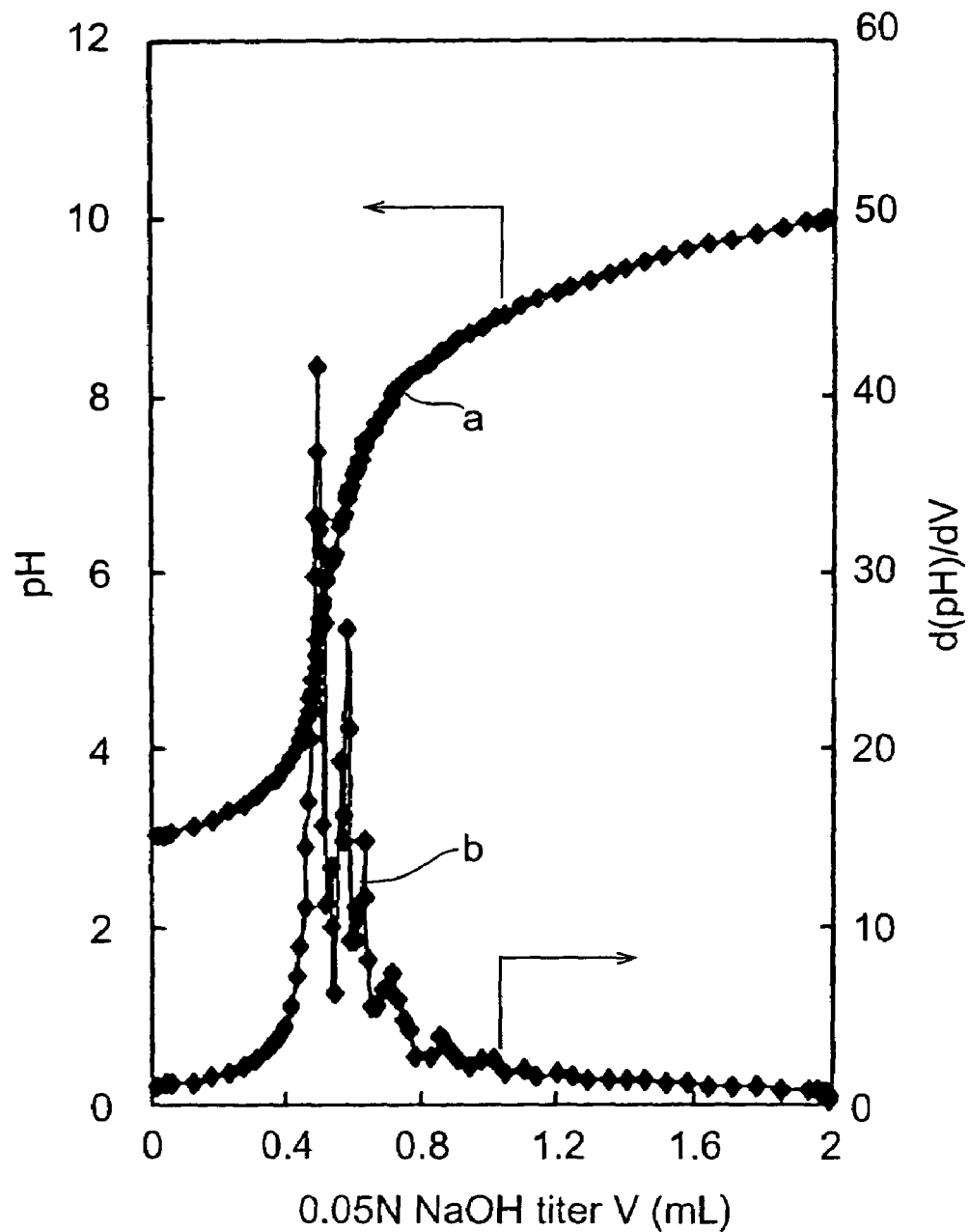
FIG. 5 is a sodium hydroxide titration graph obtained for the solid electrolyte in Example 1, in which a represents the correlation between the titer of a 0.05N sodium hydroxide aqueous solution and the pH, and b represents the correlation between the titer of a 0.05N sodium hydroxide aqueous solution and d (pH)/dV (pH) (the value obtained by differentiating the pH with the titer V)

The solid electrolyte thus obtained was subjected to sodium hydroxide titration by the following procedure. 50 mg of solid electrolyte was thoroughly vacuum dried at 70° C. and $10^{-2}$ to $10^{-3}$ Torr, after which it was soaked overnight in a 10 wt % sodium chloride aqueous solution. Titration was then performed using a 0.05N sodium hydroxide aqueous solution, and the hydrogen ion ($H^+$) equivalent was measured. The titration curve thus obtained is shown in FIG. 5. In FIG. 5, curve a is the correlation between the amount of 0.05N sodium hydroxide aqueous solution added dropwise and the pH, and curve b is the correlation between the titer of a 0.05N sodium hydroxide aqueous solution and d (pH)/dV (pH) (the value obtained by differentiating the pH with the titer V). As shown in FIG. 5, it was confirmed that $5.5\times10^{-4}$ eq/g hydrogen ions were present in the obtained solid electrolyte. These results suggest that 14.3% of the phenylene groups of the porous material skeleton (—$C_6H_4$—$Si_2O_3$—) were sulfonylated, forming a skeleton expressed by —$O_{1.5}Si$—$C_6H_3$($SO_3H$)—$SiO_{1.5}$—.

The above-mentioned solid electrolyte was also measured by X-ray diffraction and nitrogen adsorption isotherm methods. The resulting X-ray diffraction patterns are shown in FIGS. 1 and 2, the nitrogen adsorption isotherm is shown in FIG. 3, and the pore diameter distribution curve is shown in FIG. 4. These results confirmed that the mean pore diameter of the solid electrolyte was 2.8 nm, the BET specific surface area was 760 m²/g, the pore volume was 0.50 cm³, and the thickness of the pore walls was 2.5 nm, and that a uniform meso porous structure was maintained even after the introduction of sulfonic acid groups into the pores. In the X-ray diffraction patterns of the porous particles and the solid electrolyte shown in FIG. 1, three peaks are seen at 2θ=11.6, 23.5, and 35.5, and these results suggest that the benzene rings that make up the skeleton of the solid electrolyte (or porous particles) are included in the pore walls, and a regular structure is present within the pore walls.

Example 2

A solid electrolyte was produced and sodium hydroxide titration was performed in the same manner as in Example 1, except that 30 g of 60 mass % fuming sulfuric acid was used instead of the 23 g of 50 mass % fuming sulfuric acid used in Example 1, and the reaction was conducted for 5.5 hours at 75 to 85° C. As a result, it was confirmed that $3.2\times10^{-4}$ eq/g hydrogen ions were present in the obtained solid electrolyte. These results suggest that 8.3% of the phenylene groups of the porous material skeleton (—$C_6H_4$—$Si_2O_3$—) were sulfonylated, forming a skeleton expressed by —$O_{1.5}Si$—$C_6H_3$($SO_3H$)—$SiO_{1.5}$—.

Example 3

A solid electrolyte was produced and sodium hydroxide titration was performed in the same manner as in Example 1, except that 30 g of sulfuric anhydride ($SO_3$) was used instead of the 23 g of 50 mass % fuming sulfuric acid used in Example 1, and the reaction was conducted for 5.2 hours at 40° C. As a result, it was confirmed that $1.1 \times 10^{-4}$ eq/g hydrogen ions were present in the obtained solid electrolyte. These results suggest that 2.9% of the phenylene groups of the porous material skeleton ($—C_6H_4—Si_2O_3—$) were sulfonylated, forming a skeleton expressed by $—O_{1.5}Si—C_6H_3(SO_3H)—SiO_{1.5}—$.

Example 4

A solid electrolyte was produced and sodium hydroxide titration was performed in the same manner as in Example 1, except that 30 g of a mixed solution of 50 mass % sulfuric anhydride ($SO_3$) /tetrachloroethylene ($CHCl_2CHCl_2$) was used instead of the 23 g of 50 mass % fuming sulfuric acid used in Example 1, and the reaction was conducted for 5.5 hours at 50 to 60° C. As a result, it was confirmed that $1.2 \times 10^{-4}$ eq/g hydrogen ions were present in the obtained solid electrolyte. These results suggest that 3.1% of the phenylene groups of the porous material skeleton ($—C_6H_4—Si_2O_3—$) were sulfonylated, forming a skeleton expressed by $—O_{1.5}Si—C_6H_3(SO_3H)—SiO_{1.5}—$.

Comparative Example 1

A polymer solid electrolyte membrane (composed of perfluorosulfonic acid (trade name Nafion 112, made by du Pont) was evaluated for its water vapor adsorption characteristics (this test will be discussed below) as Comparative Example 1.

Comparative Example 2

The porous particles obtained in Example 1, but in which no sulfonic acid groups had been introduced into the pores, were evaluated for their water vapor adsorption characteristics (this test will be discussed below) as Comparative Example 2.

Water Vapor Adsorption Characteristics Test

The amount of water vapor adsorption was measured for the solid electrolytes obtained in Example 1 and Comparative Example 1 and for the porous particles obtained in Comparative Example 2, when water vapor whose relative pressure was controlled to a specific value was brought into contact [with the solid electrolyte or porous particles] until saturation was reached at 25° C. The water vapor adsorption isotherm obtained by this measurement is shown in FIG. 6.

Figure 6:
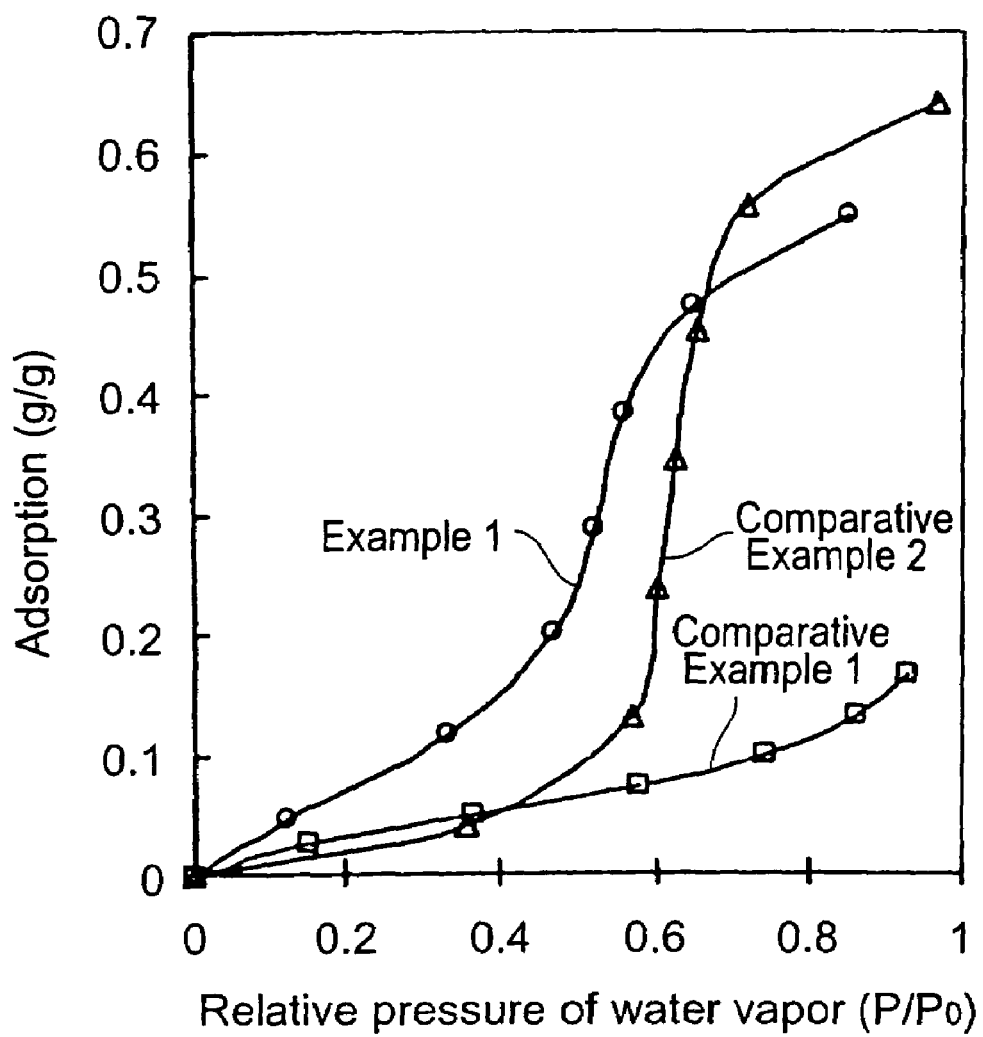
FIG. 6 is a graph of the water vapor adsorption isotherms at 25° C. obtained for the solid electrolytes in Example 1 and Comparative Example 2 and for the porous particles in Comparative Example 2.

As shown in FIG. 6, with the solid electrolyte of Example 1, it was confirmed that the amount of water vapor adsorption increased markedly when the relative pressure of the water vapor went over 0.45, and that when the relative pressure of the water vapor was 0.6, the water vapor adsorption was 0.45 g, which corresponds to 90% of the pore volume, and the pores were fully filled with water even when the relative pressure of the water vapor was less than 1.0. With the porous particles of Comparative Example 2, an increase in the relative pressure of the water vapor was again accompanied by a marked increase in water vapor adsorption, but the reason behind this was that the relative pressure of the water vapor was over 0.6. These results suggest that the introduction of sulfonic acid groups into the pores has the effect of enhancing the water vapor adsorption characteristics.

In contrast, with the solid electrolyte in Comparative Example 1, the adsorption of water vapor was insufficient even when the relative pressure of the water vapor was over 0.9, confirming that adequate ion conductivity cannot be obtained if the relative pressure of the water vapor is less than 100%.

Examples 5 to 8

Measurement of Conductivity

The solid electrolyte of Example 1 was mixed in a specific proportion with an ethanol solution (perfluorosulfonic acid content: 5%) of perfluorosulfonic acid (Nafion, made by du Pont) to form a paste. This paste was dried, after which it was molded in a tablet molding machine at a pressure of 1100 kg/cm² to obtain pellets with a diameter of 10 mm. The pellets of Examples 5 to 8 were produced here by varying the proportional content of the solid electrolyte ([amount of solid electrolyte added]/[combined amount of solid electrolyte and perfluorosulfonic acid added]) so as to be 0.60, 0.80, 0.89, and 0.91, respectively.

Each of the pellets thus obtained was sandwiched between two perfluorosulfonic acid membranes (Nafion 112, made by du Pont), the product of which was mounted in a conductivity measurement cell (electrode: platinum black plated disc coated with a perfluorosulfonic acid (Nafion) solution, electrode diameter: 10 mm), and the electrodes were pressed on at a pressure of 32 kg/cm². This cell was immersed in pure water, and the AC resistance at 1 kHz was measured with an LCR meter to find the electrical conductivity. The results thus obtained are given in Table 1.

Comparative Example 3

Porous particles were produced in the same manner as in Example 1, after which everything was carried out the same as in Example 5, except that the step of producing a solid electrolyte (sulfonylation step) was not performed, and instead [these porous particles] were directly mixed with a persulfonic acid/ethanol solution, which produced pellets containing porous particles in a proportion (calculated by weight) of 0.60, and the conductivity thereof was measured. The results thus obtained are given in Table 1.

TABLE 1

|  | Solid electrolyte proportional content | Conductivity [S/cm] |
|---|---|---|
| Example 5 | 0.60 | 0.021 |
| Example 6 | 0.80 | 0.017 |
| Example 7 | 0.89 | 0.017 |
| Example 8 | 0.91 | 0.015 |
| Comp. Example 3 | (0.60)* | 0.0014 |

*Indicates proportional content of porous particles.

As shown in Table 1, sufficiently high conductivity was attained with the pellets of Examples 5 to 8, whereas the conductivity was extremely low with the pellets of Comparative Example 3. These results suggest that sulfonic acid groups play an active part in the manifestation of conductivity. Also, since a great deal of cracking and splitting was observed after measurement in the pellets of Examples 5 to 8, it is believed that the conductivity of the solid electrolyte particles themselves is higher than indicated by the measurement values given in Table 1.

INDUSTRIAL APPLICABILITY

As described above, with the solid electrolyte of the present invention, even if the relative pressure of the water vapor in the atmosphere is less than 1.0, it is still possible to achieve a sufficiently high ion conductivity at a lower temperature than with a conventional solid electrolyte such as stabilized zirconia.

The invention claimed is:

1. A solid electrolyte, comprising:
an organic/inorganic composite material having pores with a mean diameter of 1 to 30 nm and a skeleton comprising at least one structural unit expressed by the following Formula (1)

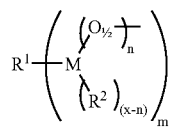

wherein
$R^1$ is an organic group with at least one carbon atom, and
M is a metal atom;
the carbons of $R^1$ to which M is bonded may be the same or different;
$R^2$ is a hydrogen atom, a hydroxyl group, or a hydrocarbon group;
x is an integer obtained by subtracting 1 from the valence of the metal M,
n is an integer greater than or equal to 1 and less than or equal to x, and
m is an integer greater than or equal to 1;
wherein said organic/inorganic composite material has at least one functional group having an ion exchange function said functional group being bonded to an organic group inside the pores;
wherein at least 60% of a total pore volume of said organic/inorganic composite material is included in the range of +/−40% of the mean pore diameter on the pore diameter distribution curve.

2. The solid electrolyte according to claim 1, wherein said functional group is a sulfonic acid group.

3. The solid electrolyte according to claim 1, wherein said functional group is a phosphoric acid group.

4. The solid electrolyte according to claim 1, which exhibits sufficient ion conductivity at a relative pressure of water vapor in an atmosphere of less than 1.0.

5. The solid electrolyte according to claim 1, wherein said pores of the organic/inorganic composite material are formed not only on the surface, but also in the interior of the organic/inorganic composite material.

6. A solid electrolyte, consisting of:
an organic/inorganic composite material having pores with a mean diameter of 1 to 30 nm and a skeleton comprising at least one structural unit expressed by the following Formula (1)

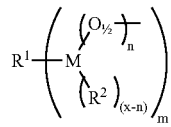

wherein
$R^1$ is an organic group with at least one carbon atom, and
M is a metal atom;
the carbons of $R^1$ to which M is bonded may be the same or different;
$R^2$ is a hydrogen atom, a hydroxyl group, or a hydrocarbon group;
x is an integer obtained by subtracting 1 from the valence of the metal M,
n is an integer greater than or equal to 1 and less than or equal to x, and
m is an integer greater than or equal to 1;
wherein said organic/inorganic composite material has at least one functional group having an ion exchange function said functional group being bonded to an organic group inside the pores;
wherein at least 60% of a total pore volume of said organic/inorganic composite material is included in the range of +/−40% of the mean pore diameter on the pore diameter distribution curve.

7. The solid electrolyte according to claim 1, wherein
$R^1$ is ethylene,
M is a silicon atom;
$R^2$ is a methyl group;
n is 1;and
m is 2.

8. The solid electrolyte according to claim 7, comprising at least two structural units of Formula (1) which are linked.

9. The solid electrolyte according to claim 1, wherein
$R^1$ is ethylene,
M is a silicon atom;
$R^2$ is a methyl group;
n is 3; and
m is 2.

10. The solid electrolyte according to claim 9, comprising at least four structural units of Formula (1) which are linked, wherein said linked structural units form a reticulated structure.

11. The solid electrolyte according to claim 1, wherein said at least one functional group having an ion exchange function is selected from the group consisting of sulfonic acid groups, phosphoric acid groups, carboxylic acid groups, sulfonimide groups.

12. The solid electrolyte according to claim 1, wherein said at least one functional group having an ion exchange function is selected from the group consisting of sulfonic acid groups, phosphoric acid groups, carboxylic acid groups, sulfonimide groups.

13. The solid electrolyte according to claim 1, wherein $R^1$ is a methylene group, ethylene group, or phenylene group.

14. The solid electrolyte according to claim 1, wherein $R^2$ is hydrogen, hydroxyl or a hydrocarbon group selected from the group consisting of $C_1$ to $C_{10}$ alkyl groups, $C_1$ to $C_{10}$ alkenyl groups, a phenyl group and substituted phenyl groups.

* * * * *